United States Patent
Wang

(10) Patent No.: US 9,498,908 B2
(45) Date of Patent: Nov. 22, 2016

(54) INTEGRATED FRAME STRUCTURE OF SLIM FAN AND MANUFACTURING METHOD THEREOF

(71) Applicant: Ping-Ling Wang, Taipei (TW)

(72) Inventor: Ping-Ling Wang, Taipei (TW)

(*) Notice: Subject to any disclaimer, the term of this patent is extended or adjusted under 35 U.S.C. 154(b) by 543 days.

(21) Appl. No.: 14/178,255

(22) Filed: Feb. 11, 2014

(65) Prior Publication Data
US 2015/0152882 A1    Jun. 4, 2015

(30) Foreign Application Priority Data
Dec. 3, 2013 (TW) ............................ 102144259 A

(51) Int. Cl.
| F04D 19/00 | (2006.01) |
| F04D 29/02 | (2006.01) |
| F04D 29/40 | (2006.01) |
| B29C 45/14 | (2006.01) |
| F04D 25/06 | (2006.01) |
| F04D 29/42 | (2006.01) |
| F04D 29/52 | (2006.01) |
| B29K 705/00 | (2006.01) |

(52) U.S. Cl.
CPC ....... B29C 45/14467 (2013.01); F04D 25/062 (2013.01); F04D 29/023 (2013.01); F04D 29/4226 (2013.01); F04D 29/522 (2013.01); B29C 2045/14327 (2013.01); B29K 2705/00 (2013.01); F05D 2230/53 (2013.01)

(58) Field of Classification Search
CPC .... F04D 19/002; F04D 25/062; F04D 29/02; F04D 29/023; F04D 29/403; F04D 29/4226; F04D 29/522; B29C 2045/14327; B29C 45/14467; B29K 2705/00; F05D 2230/53
See application file for complete search history.

(56) References Cited

U.S. PATENT DOCUMENTS

| 6,084,328 A * | 7/2000 | Yamashita | F04D 29/063 310/63 |
| 6,720,694 B2 * | 4/2004 | Horng | H02K 5/1675 310/67 R |
| 6,765,326 B1 * | 7/2004 | Nakazono | F04D 29/063 310/90 |
| 7,267,528 B2 * | 9/2007 | Hsu | F04D 29/057 415/229 |
| 7,510,331 B2 * | 3/2009 | Hong | F16C 17/26 310/90 |
| 8,753,086 B2 * | 6/2014 | Higo | F04D 25/0613 415/211.2 |
| 8,974,196 B2 * | 3/2015 | Chen | F04D 29/056 417/354 |
| 9,062,567 B2 * | 6/2015 | Kaji | F01D 25/162 |

* cited by examiner

*Primary Examiner* — Igor Kershteyn
(74) *Attorney, Agent, or Firm* — CKC & Partners Co., Ltd.

(57) ABSTRACT

An integral structure of a slim fan frame includes a metal baseplate, a bearing, a central plastic tube and a plastic flow passage sidewall which are connected to each other by integral forming. The method of manufacturing the integral structure is to simultaneously integrate the central plastic tube, the plastic flow passage sidewall, the metal baseplate and the bearing while injection molding the central plastic tube and the plastic flow passage sidewall.

2 Claims, 5 Drawing Sheets

INTEGRATED FRAME STRUCTURE OF SLIM FAN AND MANUFACTURING METHOD THEREOF

RELATED APPLICATIONS

This application claims priority to Taiwan Application Serial Number 102144259, filed Dec. 3, 2013, which is herein incorporated by reference.

BACKGROUND

Field of Invention

The present invention relates to an integrated structure. More particularly, the present invention relates to an integrated fame structure of a slim fan and manufacturing method thereof.

Description of Related Art

An electronic device generally generates heat in use, so a fan of the electronic device may be utilized to dissipate heat. According to the market trend, the design of a fan becomes thinner. The thickness of the fan is decreased from 10 mm to 4 mm, and even less than 3 mm. This thickness is beyond the manufacturing capability of the plastic injection molding. Therefore, a baseplate is generally made of metal for the frame of an ordinary slim fan.

A frame of the slim fan usually includes a metal baseplate, a bearing, a central tube and a flow passage sidewall.

Referring to FIG. 1 and FIG. 2, the frame 600 of a conventional slim fan includes a metal baseplate 610, a bearing 620 and a central copper tube 630, a flow passage sidewall 640 and a fixing ring 650. A connecting hole 611 is disposed on the center of the metal baseplate 610. The central copper tube 630 is made of copper and manufactured by lathing. The bottom of the central tube 630 is riveted in the connecting hole 611 of the metal baseplate 610. The bearing 620 is pressed into the inner side of the central copper tube 630 and the fixing ring 650 is also pressed into the inner side of the central copper tube 630 in order to fix the end of the bearing 620 and prevent it from coming off. The flow passage sidewall 640 is manufactured by forming a metal sheet with a wind lead shape and is riveted with the edge of the metal baseplate 610. Otherwise, the flow passage sidewall is manufactured by plastic injection molding with a flow passage shape and is adhered to the edge of the metal baseplate 610.

However, there are some significant disadvantages for the frame structure of the conventional slim fan and the assembly method thereof: (1) lathing the central copper tube 630 may increase cost and manufacturing time (2) riveting the central copper tube 630 and the connecting hole 611 of the metal baseplate 610 may cause unstable connection and the tilt of the central copper tube 630; (3) pressing the bearing 620 into the central copper tube 630 may cause pressing fail and deformation of the bearing 620; (4) pressing the bearing 620 into the central copper tube 630 may cause the coming off of the bearing 620 so that the additional fixing ring 650 is necessary; (6) the flow passage sidewall 640 needs additional manufacturing, adhering or soldering process. To sum up, the frame of the conventional slim fan has disadvantages of long manufacturing time, high cost, and high defect rate of products.

SUMMARY

One aspect of the present invention is to provide a frame of a slim fan with a solid and precision integral structure.

Another aspect of the present invention is to provide a simple manufacturing method of the frame of a slim fan.

According to aspects above or other aspects, the present invention provides an integral structure of a slim fan frame includes: a metal baseplate, a bearing, a central plastic tube and a plastic flow passage sidewall The metal baseplate has a ring carrier portion disposed on the center thereof and plural connecting holes adjacent to the peripheral of the ring carrier portion. The bearing has a ring body and a hole in the center of the ring body. The ring body has a bottom portion and a top portion opposite to the bottom portion. The bottom portion is rested against the ring carrier portion. The top portion has a straight section and a tilted shoulder section adjacent to each other. The central plastic tube is integrally formed to fill in the connecting holes and cover an outside of the ring body of the bearing. The plastic flow passage sidewall is integrally formed to connect the outer edge of the metal baseplate. Accordingly, the integral structure of the metal baseplate, the bearing, the central plastic tube and the plastic flow passage sidewall is precise and stable.

According to another aspect, the present invention provides a method of manufacturing a slim fan frame including the steps as below: providing a metal baseplate having plural connecting holes; providing a bearing wherein the top portion of the bearing has a straight section and a tilted shoulder section adjacent to each other; providing a mold which has a metal baseplate receiving portion, a bearing receiving portion, a central tube molding chamber and a flow passage sidewall molding chamber; placing the metal baseplate and the bearing in the metal baseplate receiving portion and the bearing receiving portion respectively; injecting melting plastic into the central tube molding chamber and the flow passage sidewall molding chamber; removing the mold after the melting plastic is solidified so that the solidified plastic forms a central plastic tube and a plastic flow passage sidewall. The central plastic tube fills in the connecting holes of the metal baseplate and covers an outside of the bearing. The plastic flow passage sidewall is connected to the peripheral of the metal baseplate to form the frame of a fan. When the injection molding of the central plastic tube and the plastic flow passage sidewall is completed, the central plastic tube, the plastic flow passage sidewall, the metal baseplate and the bearing are simultaneously integrated together. Accordingly, the manufacture of the slim fan frame is integrally accomplished.

The present invention is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. the drawings.

DESCRIPTION OF THE EMBODIMENTS

Figure 1:
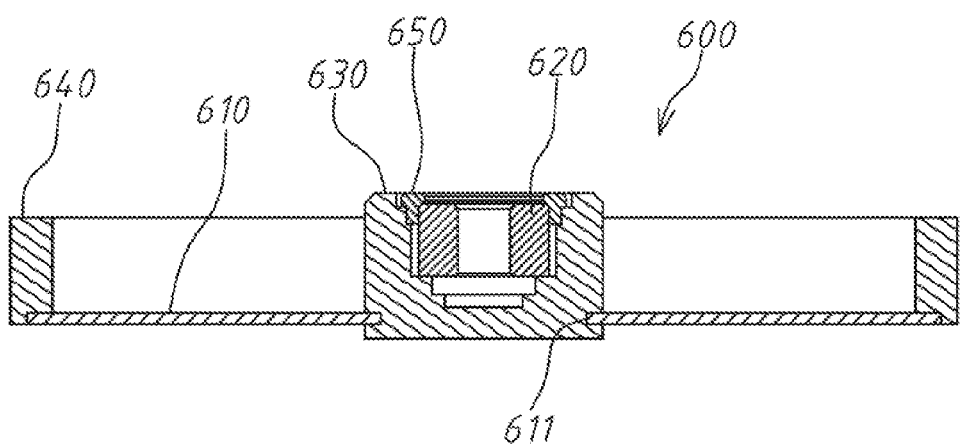
FIG. 1 is a schematic cross-section view of a frame of a conventional slim fan.
Figure 2:
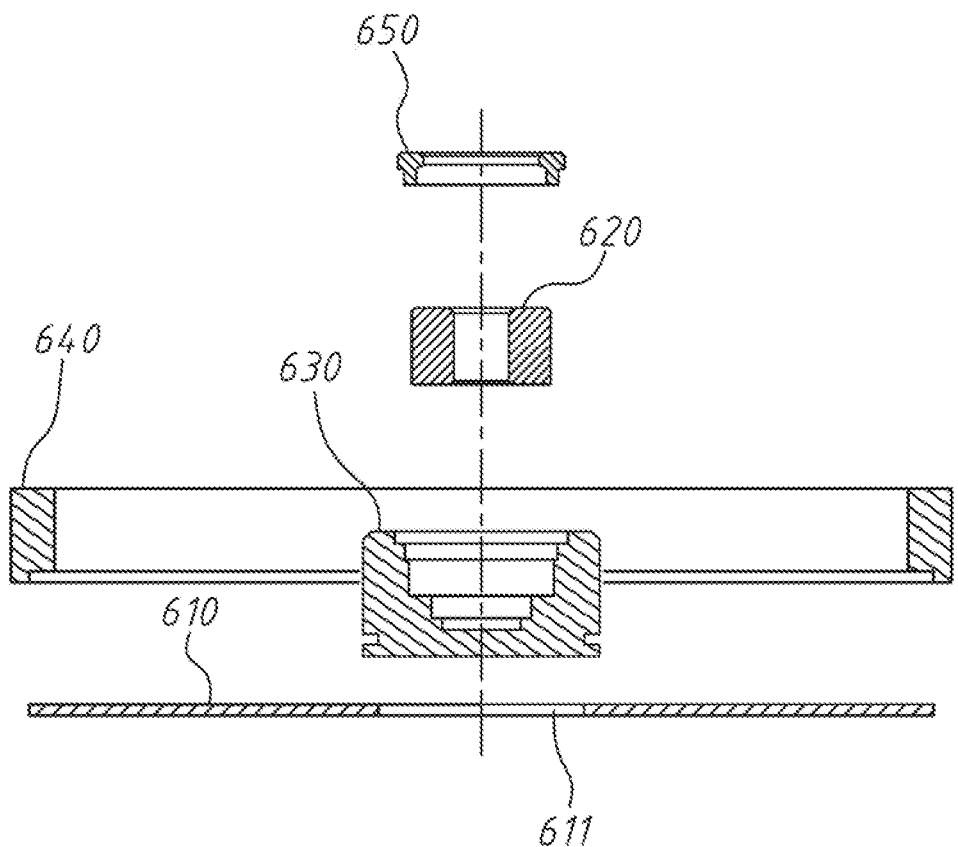
FIG. 2 is an exploded view of the frame of a conventional slim fan in FIG. 1 and illustrates the assembly structure thereof.

Reference will now be made in detail to the present embodiments of the invention, examples of which are illustrated in the accompanying drawings. Wherever possible, the same reference numbers are used in the drawings and the description to refer to the same or like parts.

Figure 3:
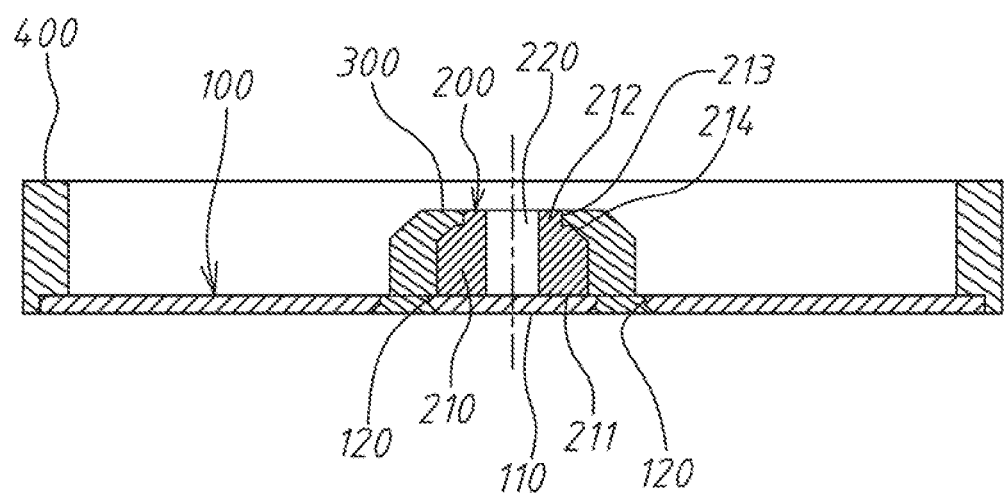
FIG. 3 is a schematic cross-section view of the integral structure of a slim fan frame according to one embodiment of the present invention.

Referring to FIG. 3, FIG. 3 is a schematic cross-section view of the integral structure of a slim fan frame according to one embodiment of the present invention. According to one embodiment of the present invention, the integral structure of a slim fan frame includes a metal baseplate 100, a bearing 200, a central plastic tube 300 and a plastic flow passage sidewall 400.

The metal baseplate 100 has a ring carrier portion 110 disposed on the center thereof and plural connecting holes 120 adjacent to a peripheral of the ring carrier portion 110.

The bearing 200 may be, for example, a powder metallurgy oil-impregnated bearing. The bearing 200 has a ring body 210 and a shaft hole 220 in the center of the ring body 210. The ring body 210 has a bottom portion 211 and a top portion 212 opposite to the bottom portion 211. The bottom portion 211 is rested against the ring carrier portion 110 of the metal baseplate 100. The top portion 212 has a straight section 213 and a tilted shoulder section 214 adjacent to each other.

The central plastic tube 300 is integrally formed to fill in the connecting holes 120 and cover an outside of the ring body 210 of the bearing 200. The plastic flow passage sidewall 400 is integrally formed to connect the peripheral of the metal baseplate 100. Because of the angled profile of the straight section 213 and the tilted shoulder section 214, the stability of the connection between the central plastic tube 300 and the bearing 200 is improved. Besides, the bottom portion 211 of the bearing 200 is rested against the ring carrier portion 110 of the metal baseplate 100, so it prevents the bearing from coming off along the bottom direction. Furthermore, the top portion 212 of the bearing 200 has the tilted shoulder section 214 which is covered by the central plastic tube 300, so it prevents the bearing from coming off along the top direction.

According to one embodiment of the present invention, the central plastic tube 300 is integrally formed to fill in the connecting holes 120 and cover an outside of the ring body 210 of the bearing 200. The plastic flow passage sidewall 400 is integrally formed to connect the peripheral of the metal baseplate 100. Accordingly, the integral structure of the metal baseplate, the bearing, the central plastic tube and the plastic flow passage sidewall is completed. The connection between the components is solid and precise.

Figure 4:
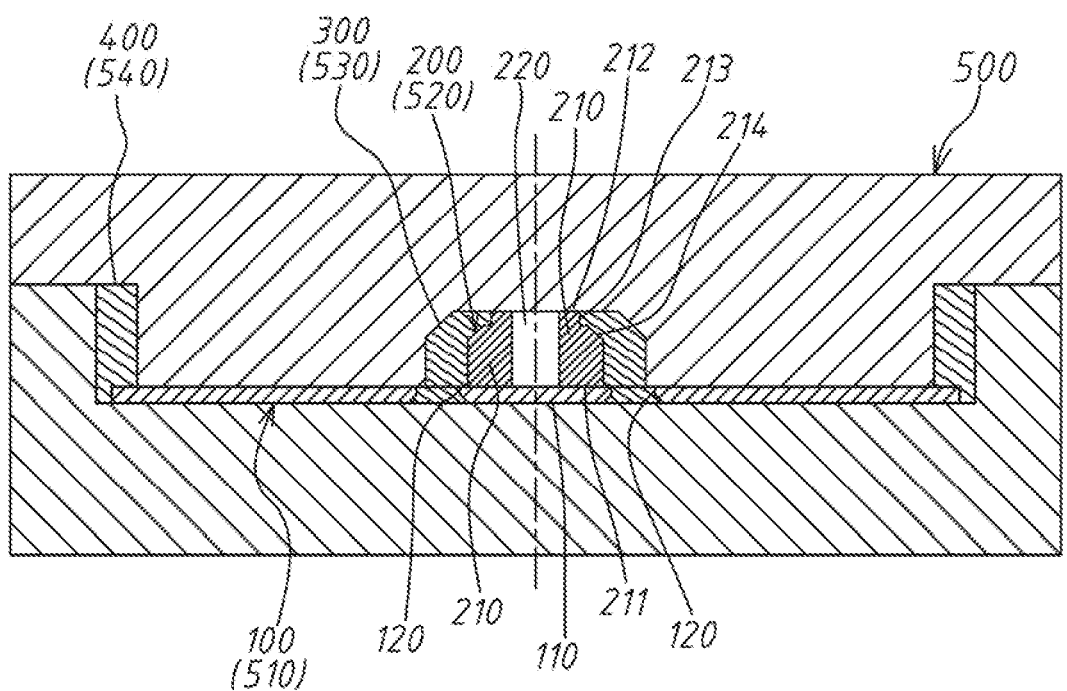
FIG. 4 is a schematic view of a mold for manufacturing the integral structure of the slim fan frame in FIG. 3 and illustrates the relation between the mold and the integral structure of the slim fan frame.
Figure 5:
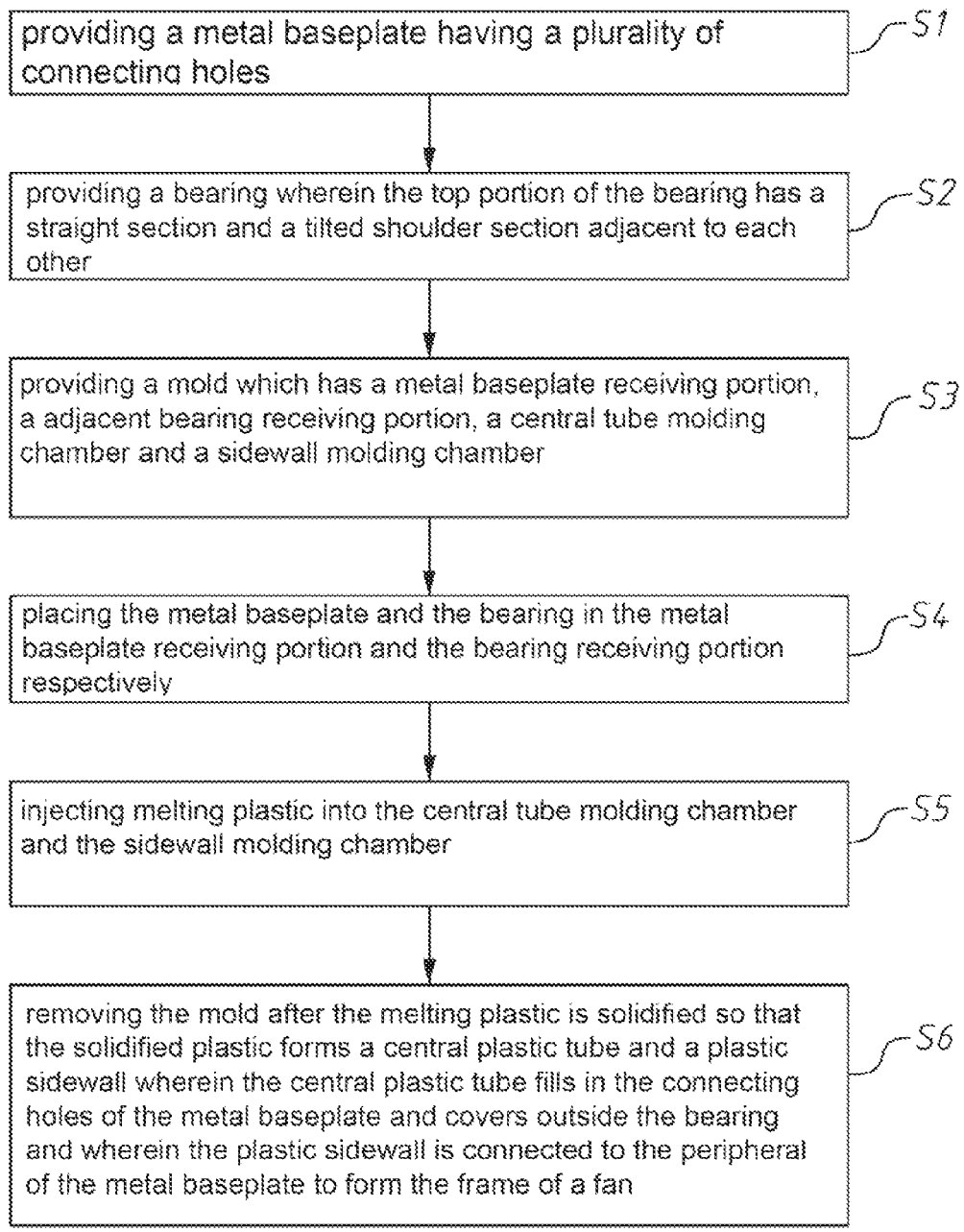
FIG. 5 is a flow chart of the method of manufacturing the integral structure of a slim fan frame according to one embodiment of the present invention.

Referring to FIG. 4 and FIG. 5, FIG. 4 is a schematic view of a mold for manufacturing the integral structure of the slim fan frame and FIG. 5 is a flow chart of the method of manufacturing the integral structure of a slim fan frame according to one embodiment of the present invention. The method of manufacturing a slim fan frame includes the steps as below: (1) providing a metal baseplate 100 which has plural connecting holes 120 (S1); (2) providing a bearing 200 wherein the top portion 212 of the bearing 200 has a straight section 213 and a tilted shoulder section 214 adjacent to each other (S2); (3) providing a mold 500 which has a metal baseplate receiving portion 510, an adjacent bearing receiving portion 520, a central tube molding chamber 530 and a flow passage sidewall molding chamber 540 (S3); (4) placing the metal baseplate 100 and the bearing 200 in the metal baseplate receiving portion 510 and the bearing receiving portion 520 of the mold 500 respectively (S4); (5) injecting melting plastic into the central tube molding chamber 530 and the flow passage sidewall molding chamber 540 of the mold 500 (S5); (6) removing the mold 500 after the melting plastic is solidified so that the solidified plastic forms a central plastic tube 300 and a plastic flow passage sidewall 400. The central plastic tube 300 fills in the connecting holes 120 of the metal baseplate 100 and covers an outside of the bearing 200. The plastic flow passage sidewall 400 is connected to the peripheral of the metal baseplate 100 to form the frame of a fan (S6).

According to the manufacturing method of the present invention, when the injection molding of the central plastic tube 300 and the plastic flow passage sidewall 400 is completed, the central plastic tube 300, the plastic flow passage sidewall 400, the metal baseplate 100 and the bearing 200 are integrated together simultaneously. Accordingly, the method of manufacturing a slim fan frame is accomplished. This manufacturing method is simple so that time of assembly, equipment cost and labor cost are saved. The structure of the slim fan frame of the present invention is solid so that the defects in the conventional slim fan frame are improved. This manufacturing method prevents the bearing from deformed by over-pressing during the conventional assembly of the slim fan frame. Therefore, the accuracy of the bearing is ensured so that the product quality is enhanced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of the present invention provided they fall within the scope of the following claims and their equivalents.

What is claimed is:

1. An integral structure of a slim fan frame, comprising:
   a metal baseplate having a ring carrier portion disposed on a center thereof and a plurality of connecting holes adjacent to a periphery of the ring carrier portion;
   a bearing having a ring body and a shaft hole in a center of the ring body, wherein the ring body has a bottom portion and a top portion opposite to the bottom portion, wherein the bottom portion is rested against the ring carrier portion of the metal baseplate, and the top portion has a straight section and a tilted shoulder section adjacent to each other;
   a central plastic tube integrally formed to fill in the connecting holes and cover an outside of the ring body of the bearing; and
   a plastic flow passage sidewall integrally formed to connect a periphery of the metal baseplate.

2. A method of manufacturing an integral structure of a slim fan frame, comprising:
   providing a metal baseplate having a plurality of connecting holes;

providing a bearing, wherein the top portion of the bearing has a straight section and a tilted shoulder section adjacent to each other;

providing a mold having a metal baseplate receiving portion, an bearing receiving portion, a central tube molding chamber and a flow passage sidewall molding chamber;

placing the metal baseplate and the bearing in the metal baseplate receiving portion and the bearing receiving portion respectively;

injecting melting plastic into the central tube molding chamber and the flow passage sidewall molding chamber; and removing the mold after the melting plastic is solidified so that the solidified plastic forms a central plastic tube and a plastic flow passage sidewall, wherein the central plastic tube fills in the connecting holes of the metal baseplate and covers an outside of the bearing and the plastic flow passage sidewall is connected to a periphery of the metal baseplate to farm the frame of a fan.

* * * * *